INVENTORS
Walter Kull
Klaus Steiner

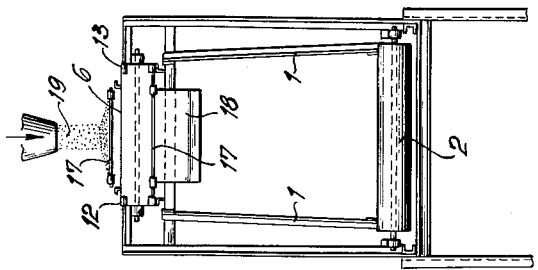
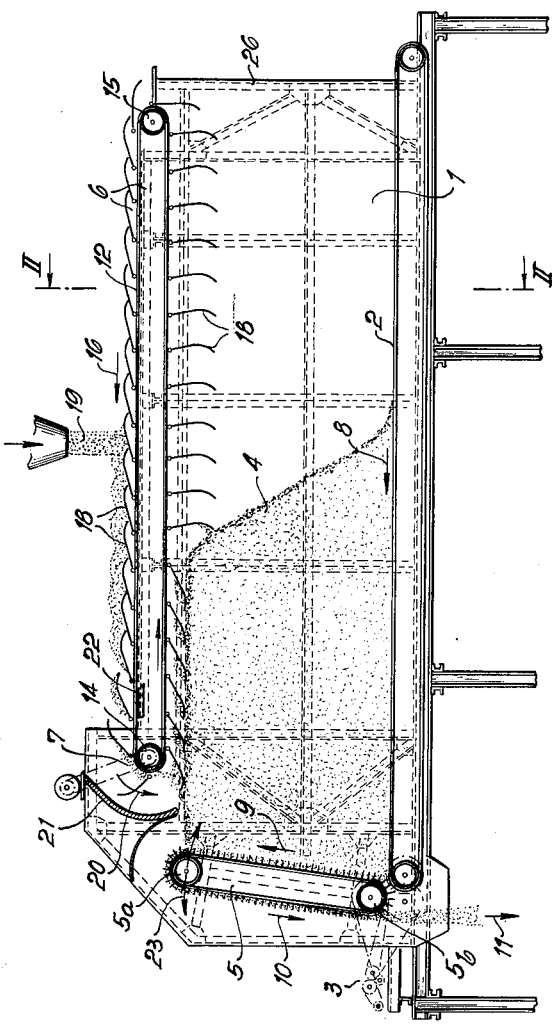

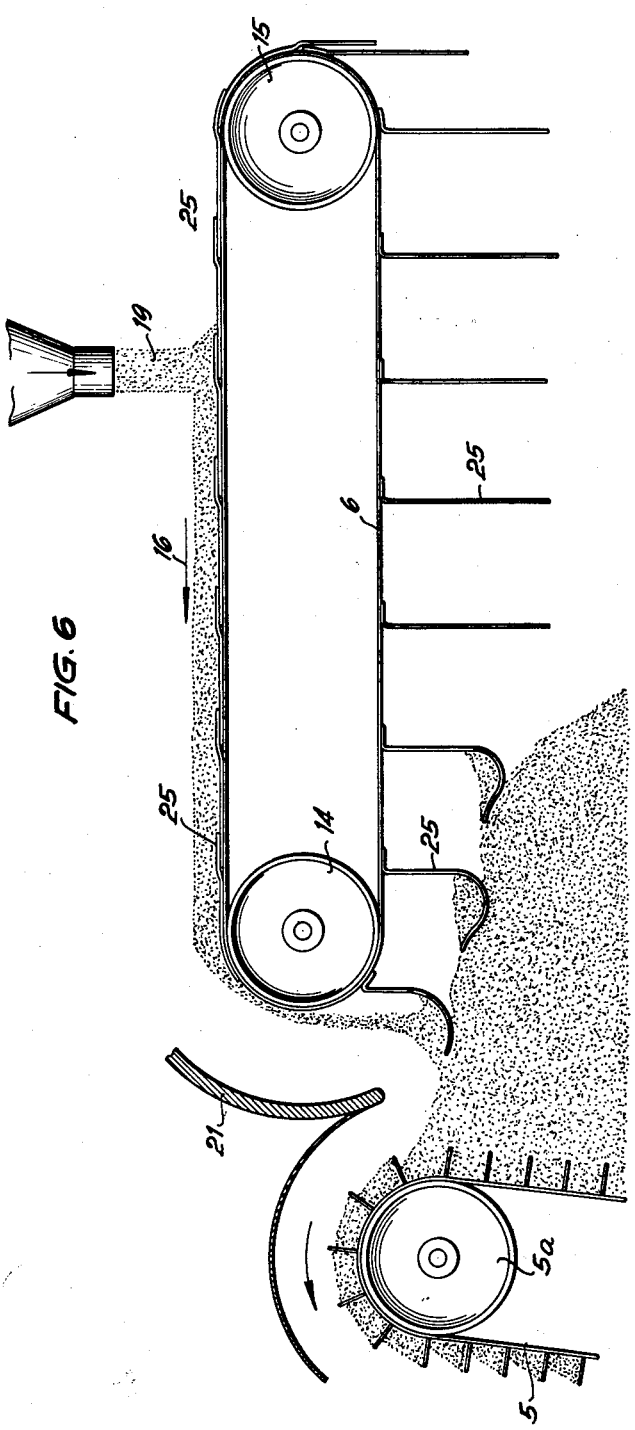

United States Patent Office 2,717,703
Patented Sept. 13, 1955

2,717,703

DEVICE FOR STORING POURABLE SOLID STOCK SUCH AS SHAVINGS, FIBERS, SHREDS, AND THE LIKE

Walter Kull, Freudenstadt, and Klaus Steiner, Bad Tolz, Germany, assignors, by mesne assignments, to Allwood Incorporated, Glarus, Switzerland, a corporation of Switzerland Application September 30, 1953, Serial No. 383,190

6 Claims. (Cl. 214—17)

Our invention relates to devices for the storing and dispensing of pourable solid stock, such as shavings, fibers, shreds and the like. More particularly, the invention concerns devices that permit controlling the supply and the discharge of stock independently of each other, and that are suitable for use with particle stock of pronounced felting or interlacing tendencies.

Containers for the storing and apportioning of pourable and free-flowing solid material, such as sand, gravel, coke, coal, flour, sawdust and the like, have become known in various designs as silos, storage tanks, or bins. The structures generally used for such purposes have their main dimension extending in a vertical or approximately vertical direction, the stock being supplied from above and dispensed below. It has also been attempted to control the discharge of the pourable stock as to quantity, volume or uniformity. The means heretofore proposed for such purposes, however, fail to operate satisfactorily when the stock material has interfelting or interlacing tendencies as is the case, for instance, with wood fibers and other fibers or particles of vegetable origin, hair, elongated wood shreds, fibers or threads of animal, artificial, and mineral or other inorganic origin. This failure is due to the fact that such materials cause clogging or clamping of the discharge devices, or that these devices are incapable of properly seizing and conveying the materials. Besides, the silo-shaped bins are often unsuitable for such materials because the materials may form bridges within the silo space and hence do not, or not reliably, travel downwardly within the silo even if assisted by auxiliary devices.

For that reason, attempts have been made to provide for such interlacing materials, a particular silo structure whose cross section widens toward its bottom so that, generally, the material itself will not clog the silo. Such silos have been equipped with dispensing devices that occupy the entire bottom area of the silo space and comprise a grating formed of a number of revolving spike drums.

In general, the stock materials of the types here of main interest are rather voluminous and easily compressible; and this is the reason for an essential shortcoming of storing devices of the just-mentioned kind. For receiving a sufficient amount of stock, the silo must be given a very large height. Consequently, the stock located in the range of the dispensing devices at the bottom of the silo is compressed by the weight of the stock above; and the amount of compression differs depending upon whether the silo is nearly empty, moderately filled, or filled to capacity. As a result, the quantity of stock removed from the silo by the dispensing devices varies very greatly with the filling degree. Although the dispensing devices are intended to convert an irregular and intermittent supply of stock into a steady flow of discharge, they fail to satisfactorily avoid fluctuations due to such differences in weight and pressure. Besides, the variations in density of the stock reaching the dispensing devices is often the cause of operational trouble.

So far, the best suitable dispensing devices consist of the above-mentioned revolving gratings of spike drums. Such spike drums, however, are sensitive to coarse inclusions and hence are subject to numerous and costly trouble since such inclusions, as a rule, are not avoidable.

It is, therefore, an object of our invention to provide a device for the storing and demandwise dispensing of pourable solid stock, particularly shavings, fibers, shreds and the like, which eliminates all above-mentioned deficiencies of the known devices.

To this end and in accordance with our invention we provide a bin structure whose bottom is formed by an endless conveyor and which has a front side formed by an endless scraper facing against the travel direction of the conveyor. We further provide a feeder conveyor that covers the storage space of the bin structure and, in its lower run, has a travel direction opposed to that of the bottom conveyor. The feeder conveyor is engageable with the pile of stock carried by the bottom conveyor when this pile reaches a given height. Due to such engagement with the top of the pile, the feeder conveyor can add a supply of stock only at the rear of the pile.

According to a more specific feature of our invention, we provide the feeder conveyor with transverse conveyor members or flaps which are individually articulated in a direction transverse to the conveyor travel. The flap members overlap one another in the upper run of the feeder conveyor and may drop down to a pendant position when passing from the upper to the lower run of the conveyor. The feeder conveyor and the pertaining flap members are mounted at such a height, relative to the uppermost travel point of the endless scraper, that the lower edges of the flap members lie below that point when the flap members are in the fully pendant position.

In storing devices according to the invention, the main dimension of the storage space is horizontal, and the space is automatically filled with a stock in the horizontal and vertical directions in such a uniform manner that the stock material, when arriving at the dispensing scraper device, has always a uniform compression and density. The supply of stock in such a device is always uniformly distributed even with a storage space of very large capacity.

The dispensing device is suitable for stock of various types, from free-flowing material up to material of pronounced felting and interlacing tendencies, and, if desired, can rapidly and easily be adapted to the requirements of any particular stock material. The device is insensitive to foreign and coarse inclusions within the stock material. Devices according to the invention, therefore, afford utmost reliability of operation.

According to another feature of our invention, we provide in front of the feeder conveyor and ahead of the endless scraper a guiding structure adapted to the flight curve of the flap members for retarding the downward travel of the flap members to thus prevent part of the stock supply from being deposited at undesired places. For securing a most uniform filling of the storage space, we preferably provide the feeder conveyor with means that coact with the travelling flap members and place each flap member into an erect position shortly before it passes from the upper to the lower run of the conveyor so that the amount of stock being conveyed by the flap member will slide off into the storage space or onto the rear surface of the preceding flap member shortly ahead of the reversing point of the conveyor travel.

In devices according to the invention, the endless scraper is preferably designed as a belt or chain conveyor. The travel direction of the scraper belt, at its side facing the stored pile of stock, may be upward or downward. However, we prefer having the endless-belt scraper travel in the upward direction because this prevents the danger of clogging and the occurrence of excessive interfelting between the scraper and the bottom conveyor.

It is further of advantage in devices according to invention to make the endless-belt scraper adjustable as regards its angular position relative to the bottom conveyor, thus improving the possibility of adapting the operation of the device to the particular requirements of various applications.

The foregoing and more specific objects, advantages, and features of our invention will be apparent from the embodiments exemplified on the drawings and described in the following. In the drawings:

Fig. 1 shows schematically a sectional side view of a storing and dispensing device, and Fig. 2 a cross section of the same device along the vertical plane denoted by I—I in Fig. 1.

Figs. 3 and 4 show cross-sectional views of two different modifications of flap members pertaining to the feeder conveyor of the device shown in Figs. 1 and 2, while Fig. 6 is a schematic illustration of part of another storing and dispensing device.

Figure 3:
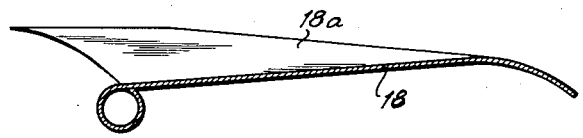

The device illustrated in Figs. 1 and 2 comprises a bin or silo structure whose main extension is horizontal. The bin structure has two stationary lateral walls 1 that are somewhat inclined upwardly toward each other. The bottom of the storage space defined by the bin structure is formed by an endless-belt conveyor 2 whose conveying direction is indicated by an arrow 8. The rear end of the storage space is closed by a stationary wall 26. An endless-belt scraper 5 is located at the front of the storage space. Another endless-belt conveyor 6 covers the top of the storage space and extends parallel to the bottom conveyor 2.

The bottom conveyor 2 may have a conveyor belt of the kind customary for conventional transfer conveyors consisting, for instance, of a web or woven material of rubber, plastic, textile, or combinations of these materials. The conveyor, however, may also be designed as a chain-type belt composed of a multiplicity of individual plates articulately linked with one another.

The endless belt of scraper 5 consists preferably of a strong web or woven material of rubber or plastic which is occupied by numerous pricks, prick ledges, metal combs or the like scraper elements. However, it may also be designed as a chain-type conveyor with articulated plates beset with the pricks or other scraper elements. The direction of operation of the endless scraper 5 is upward as is indicated by an arrow 9. The pile 4 of stock carried by the travelling bottom conveyor 2 is kept in contact with the dispensing scraper 5 so that the scraper removes stock from the front of the pile and carries it upwardly out of the bin space over the upper guide roller or drum 5a and down in the direction of the arrow 10 so that the stock may drop through the discharge opening 11 of the bin. The scraper 5 extends across the entire horizontal width of the storage space so that the stock material issuing from opening 11 is discharged as a flowing veil extending substantially across the entire width of the storage space.

The feeder conveyor 6 at the top of the bin structure is preferably formed of two chains, belts, ropes or the like endless members denoted by 12 and 13 respectively. These endless members are guided about drums, sprockets or wheels 14 and 15 at the front and rear of the conveyor. The two endless conveyor members 12 and 13 are interconnected in regular intervals by rods or pipes 17 that may have a circular cross section and serve as pivots for respective flap members 18 preferably of sheet metal. The individual flap members have a curved shape and are readily movable about the pivot rods. When the feeder conveyor 6 is travelling in the direction indicated by the arrow 16, the flaps in the upper run of the conveyor overlap each other like scales and thus form a continuous top area on which the stock material, deposited from a hopper or other source of supply, will travel toward the front of the bin structure. In the lower run of the feeder conveyor 6, the flap members 18, due to their weight, may drop to a pendant position so that they cannot retain any stock material.

When the flap members 18 reach the forward end of the upper run and move about the axis of the conveyor guide 7, they tilt downwardly in the direction of the arrow 20. If the pile of stock 4 does not reach up to the flap members, the flap members may immediately drop to the fully pendant position so that they discharge the supply of stock in the front portion of the storage space. With a sufficient supply of stock material, therefore, the height of the stock pile gradually increases and eventually becomes so large that the flaps, when reaching the lower run of the feeder conveyor, can no longer drop to the pendant position but will first slide along the top of the stock pile as is apparent from Fig. 1. When this occurs, any flap member moving about the guide 7 to the top of the pile receives on its back surface the amount of stock coming from the next following flap member and then carries this amount of stock along the top toward the rear end of the pile where the flap member becomes free to drop to the pendant position. Thus, the individual amounts of stock are always deposited at the rear of the stock pile so that, as long as the consumption does not exceed the supply, the pile will gradually build up toward the rear end of the storage space.

In this manner, the trough-shaped storage space is filled with stock from the side of the dispensing scraper so that the accumulated stock has always a uniform height limited by the action of the feeder conveyor. Regardless of whether the supply of stock is ample or scarce, and regardless of whether or not the dispensing scraper is in operation, any additional supply of stock will always be stored on the side of the pile remote from the dispensing end and will always maintain a predetermined and uniform height. The increase or decrease in the amount of stored stock depends only upon the ratio of supply to discharge. The stock material first stored is always discharged ahead of stock supplied at a later time. The conditions of the stock adjacent to the discharging scraper belt are always the same regardless of whether the bin is filled to capacity or is nearly empty.

Mounted in front of the feeder conveyor 6 and located between this feeder and the top of the endless-belt scraper is a guide 21 such as a bracket or sheet-metal structure which is slidingly engageable with the individual flap members 18 during the reversing travel of these members. The guide 21 thus retards and controls the flip-over movement of the flap members so that the amount of stock will safely drop upon the back of the next preceding flap member rather than toward the upward flow of stock material being discharged by the scraper. Part 21 may also form a baffle wall across the width of the bin space to combine and direct the movement of the stock material thrown off the flap members. This effect may also be obtained if part 21 is not engaged by the travelling flap members themselves.

For further improved reliability of operation, the device is further equipped with control means which engage the flap members shortly before the end of the upper run of the feeder conveyor and which place the flap members in an erect position shortly before the flaps start passing to the lower run. In the illustrated device, the just-mentioned control means consist of a stationary cam 22 which has a slide surface engageable by a downwardly projecting part of each flap member so that the member is turned upwardly as it runs onto the slide cam. As a result, the flap member starts discharging stock material shortly before it commences to swing downwardly.

The material then sliding off the flap member drops through the space between the conveyor chains 12, 13 and between the cross rods 17 onto the back of the next preceding flap member. This secures a high degree of uniformity in the height of the stock pile.

For indicating whether the bin is full, empty or no longer sufficiently filled, the storing device may be equipped with conventional signalling means indicative of the presence of stock in the vicinity of the dispensing scraper, or near the opposite end of the storage space.

For adapting the bin structure to the properties of particular stock material, it is sometimes desirable to give the endless-belt scraper a travelling direction inclined toward the vertical. It is, therefore, preferable to make the endless-belt scraper tiltable about the axis of its lower revolving guide 5b, this angular adjustability being indicated in Fig. 1 by a double-headed arrow 23.

Figure 4:
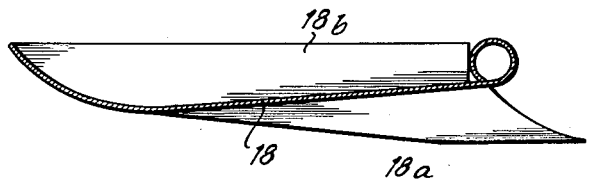

The flap members 18 of the feeder conveyor are preferably given such a curvature that they are capable of readily conveying the supply of stock to the rear end of the stock pile 4 without losing the stock. The flap members, therefore, may have a pan-shaped design as apparent from Figs. 3 and 4. For obtaining a uniform filling of the storage space up to the lateral walls 1 of the bin, the flap members 18 may be equipped with side walls as shown at 18a in Fig. 3, or at 18a and 18b in Fig. 4 so that they can be filled with stock material over their entire width without permitting the material to run off laterally.

Figure 5:
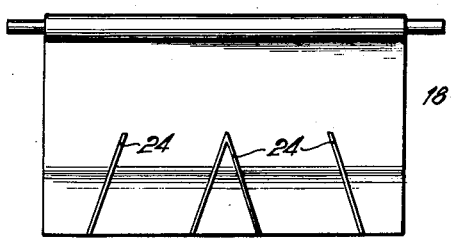
Fig. 5 shows a front view of a similar flap member in conjunction with another modification.

The flap members may further be equipped according to Fig. 5 with guiding ridges 24 which distribute the stock material, when running off the flap, over the entire width of the storage space.

In general, the feeder conveyor is driven separately from the bottom conveyor and the scraper. The scraper belt and the bottom conveyor may also be driven individually and independently of each other; but they may also be coupled with each other in a fixed or adjustable speed ratio. The amount of stock material being dispensed by the operation of the scraper can be varied and adjusted by varying the respective running speeds of bottom conveyor and scraper. As long as the scraper has a sufficient large operating speed, the amount of stock being dispensed can be varied within certain limits by merely varying the speed of the bottom conveyor.

Instead of making the flap members 18 of sheet metal or other rigid material, they may also be made of flexible material such as textile fabric, especially when the stock material is particularly light in weight. An embodiment of this type is partly illustrated in Fig. 6, showing schematically only the feeder conveyor and the upper portion of the endless scraper. The feeder conveyor 26, which in this case may consist of a conventional conveyor belt, is equipped with flaps 25 of flaccid material which overlap each other in the upper run of the feeder conveyor and drop into the pendant position during the lower conveyor run. In all other respects, the device may be similar to that described in reference to Figs. 1 and 2.

In the manufacture of pressed wood-particle panels from pourable and interlaceable wood shavings, devices according to the invention are applicable for depositing the shavings onto a travelling conveyor in the form of a mat to be subsequently compressed and otherwise fabricated into solid wood-shavings panels. However, such devices are likewise of advantage for the storing and dispensing of pourable solid particle stock to be used for other industrial purposes. It will also be obvious to those skilled in the art upon a study of this disclosure that devices according to our invention may be modified in various respects, particularly as regards the design arrangement and shape of their individual components without foregoing the essential objects and salient features of the invention and within the scope of the claims annexed hereto.

We claim:

1. A device for the storing and dispending of pourable solid stock such as shavings, fibers, shreds and the like, comprising a bin structure having a bottom and two lateral walls defining together a storage space, an endless conveyor forming said bottom of said bin structure for carrying a pile of stock and having a conveying direction toward said front wall, an endless-belt scraper extending from said bottom conveyor upwardly along the front of said bin structure and having an upward direction of scraping travel at the scraper side facing said storage space, an endless feeder conveyor having an upper run and a lower run extending along the top of said bin structure in parallel relation to said bottom conveyor and having in said upper run a conveying direction toward said scraper, said two conveyors and said lateral walls having a horizontal length which is a multiple of the vertical spacing between them so that said storage space is horizontally elongated and the stock pile normally has a given height and a variable horizontal length, said feeder conveyor having a number of transverse flap members each articulated transversely of the conveyor travel, said flap members overlapping each other in the upper run of said feeder conveyor and being downwardly movable to a pendant position in the lower run of said feeder conveyor for engaging said pile when said pile reaches a given height, and stock supply means disposed above said feeder conveyor for charging stock onto said overlapping flap members, whereby said feeder conveyor adds supplied stock to the rear end of the pile and said endless scraper conveys stock from the front of the pile upwardly over the top of the scraper to the outside of said storage space.

2. In a device according to claim 1, said feeder conveyor having a travel reversing point located in spaced relation to said scraper, and a guide structure disposed between said feeder conveyor and said scraper, said guide having a baffle surface facing said feeder conveyor and having a shape adapted to the flight curve of said flap edges for retarding the downward movement of said members.

3. A device according to claim 1, comprising guide means mounted near said feeder conveyor near the location where said flap members travel from the upper run to the lower run of said feeder conveyor, said guide means being engageable with the travelling flap members for erecting them from the overlapping position shortly prior to their entering said storage space.

4. A device for the storing and dispensing of pourable solid stock such as shavings, fibers, shreds and the like, comprising a bin structure having a bottom, two side walls and a front wall, an endless conveyor forming said bottom of said bin structure for carrying a pile of stock and having a conveying travel directed toward said front wall, said bottom conveyor having a forward end of travel horizontally spaced from said front wall, said bin structure having a stock dispensing opening located between said front wall and said forward end of said bottom conveyor, an endless-belt scraper disposed above said dispensing opening and extending from said forward end of said bottom conveyor upwardly in spaced relation to said front wall, said scraper having an upward direction of scraping travel at the side facing the stock pile whereby said scraper causes stock from said forward end of said bottom conveyor to pass upwardly over the uppermost point of the scraper and thence downwardly between said scraper and said front wall to said dispensing opening, a feeder conveyor upwardly spaced from said bottom conveyor and extending substantially parallel thereto, said feeder conveyor having at its lower side a direction of travel opposed to that of said bottom conveyor, said feeder conveyor having stock-carrying means with which said pile is engageable when reaching a given height so as to cause said means to add stock at the rear end of said pile, and stock supply means above said feeder conveyor for charging stock onto said feeder conveyor.

5. A device for the storing and dispensing of pourable solid stock such as shavings, fibers, shreds and the like, comprising a bin structure having a bottom and two lateral walls defining together a storage space, an endless conveyor forming said bottom of said bin structure for carrying a pile of stock and having a conveying direction toward said front wall, an endless-belt scraper extending from said bottom conveyor upwardly along the front of said bin structure and having an upward direction of scraping travel at the scraper side facing said storage space, an endless feeder conveyor having an upper run and a lower run extending along the top of said bin structure in parallel relation to said bottom conveyor and having in said upper run a conveying direction toward said scraper, said two conveyors and said lateral walls having a horizontal length which is a multiple of the vertical spacing between them so that said storage space is horizontally elongated and the stock pile normally has a given height but variable horizontal length, said feeder conveyor having a number of transverse flap members each articulated transversely of the conveyor travel, said flap members overlapping each other in the upper run of said feeder conveyor and being downwardly movable to a pendant position in the lower run of said feeder conveyor, said flap members having respective lower edges located at a lower height than the uppermost travel reversing point of said endless-belt scraper when said flap members are in said pendant position, and stock supply means mounted above said feeder conveyor for charging stock onto said overlapping flap members.

6. A device for the storing and dispensing of pourable solid stock such as shavings, fibers, shreds and the like, comprising a bin structure having a bottom and two lateral walls defining together a storage space, an endless conveyor forming said bottom of said bin structure for carrying a pile of stock and having a conveying direction toward said front wall, an endless-belt scraper extending from said bottom conveyor upwardly along the front of said bin structure and having an upward direction of scraping travel at the scraper side facing said storage space, said endless belt scraper having a revolving lower belt guide and a revolving upper belt guide, said lower guide being located at the forward end of said bottom conveyor and said upper guide being angularly displaceable about said lower guide for changing the inclination of said scraping travel relative to said bottom conveyor, a feeder conveyor disposed above said space and having at the conveyor side facing said space a direction of conveying travel opposed to that of said bottom conveyor, said feeder conveyor having stock-carrying means with which said pile is engageable when reaching a given height so as to cause said means to add stock at the rear end of said pile, and stock supply means above said feeder conveyor for charging stock onto said feeder conveyor.

References Cited in the file of this patent

UNITED STATES PATENTS

| 568,583 | Richards | Sept. 29, 1896 |
| 1,571,364 | Bates | Feb. 2, 1926 |
| 1,890,762 | Whyte | Dec. 13, 1932 |

FOREIGN PATENTS

| 850,428 | France | Dec. 16, 1939 |